United States Patent Office 2,695,490
Patented Nov. 30, 1954

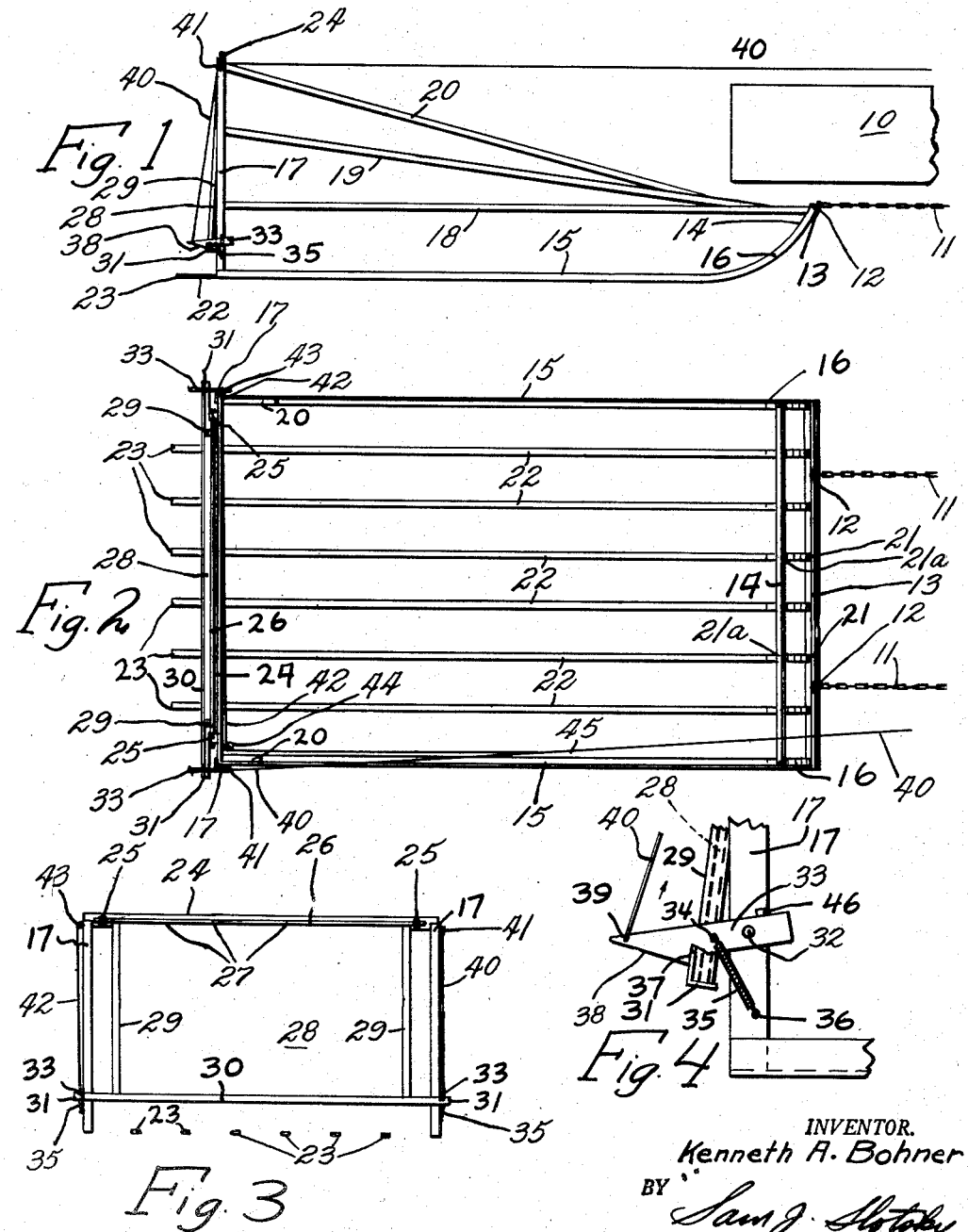

2,695,490

SKID CARRIER FOR HAY BALES

Kenneth A. Bohner, South Sioux Falls, S. Dak., assignor of one-half to Peter J. De Grote, Windom, Minn.

Application January 4, 1952, Serial No. 264,930

2 Claims. (Cl. 56—474)

My invention relates to a skid carrier for hay bales. An object of my invention is to provide a carrier which can be attached behind a hay baler, so that the bales of hay when discharged from the baler, will drop into the carrier, and whereby such bales will then pass rearwardly in the carrier as the carrier is drawn forwardly, until several bales are gathered, and whereby a rear gate on the carrier can be readily released so that the bales will then pass out of the carrier and onto the field in a compact mass of several bales at one location, thereby rendering it easier for such bales to be gathered as against the practice wherein individual bales will be deposited at intervals.

A further object of my invention is to provide a simplified structure to provide this result, and which can readily turn and the like.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

Figure 1 is a side elevation of the skid carrier as attached to a baler,

Figure 2 is a plan view of Figure 1,

Figure 3 is a rear view of Figure 1, and

Figure 4 is a detail of the latching arrangement.

My invention contemplates the provision of a carrier unit which can be drawn behind a hay baler, whereby several bales of hay can be deposited in the unit, with the unit traveling smoothly along the field surface.

I have used the character 10 to designate generally the rear end of a hay baler, from which the finished bales of hay will be deposited, and I have used the character 11 to indicate a pair of chains which are suitably attached in any desired manner to the hay baler for pulling the carrier, the chains being attached at 12 to the forward end of the carrier of my invention.

The character 13 indicates a transverse angle member and the character 14 indicates a further transverse bracing angle member, and to these members are attached the forwardly extending further angle members 15 having the arcuate forward portions at 16. The members 15 are attached to a pair of rear vertical angle members 17, and also attached between the forward ends of the members 16 and the members 17 are the bracing angle members 18, the structure being further braced by means of additional angle members 19 and 20 at either side of the arrangement.

Attached to the forward angle member 13 with the bolts 21 are several equally and laterally spaced skid straps 22 which terminate at the points 23, it being noted that the straps are unsupported at their rear ends 23.

Attached across the top of the members 17 is a strap brace 24 upon which are mounted the bearings 25, and received in the bearings 25 is a pipe 26 to which is attached at 27 a metal door or plate 28, the plate 28 including the side bracing angle members 29 attached thereto, and with a laterally positioned angle member 30 being attached along the lower edge of the gate or door 28, the angle member 30 including the projecting portions 31.

Pivotally attached at 32 to both members 17 are the latch members 33 to which are attached at 34 the springs 35 which springs are attached at 36 to the members 17. The latch members 33 include the shoulders 37 which merge with the sloping surfaces 38, and attached at 39 to one of the latch members 33 is a cable 40 which passes over a pulley 41, which cable passes rearwardly to any desired point for controlling the unit, and also attached to the further latch member 33 at the other side of the arrangement is a further similar cable 42 which passes over the pulley 43 and thence about a further small pulley 44, with the cable 42 being joined at 45 if desired to provide synchronous action of both latch members at the same time that the cable 40 is pulled.

Stop members 46 can be provided to limit movement of the latches 33 in the reverse direction.

The skid carrier operates in the following manner. Figure 2 is a plan view with the hay baler portion 10 not being shown for clarity, as well as certain of the bracing members being broken away for the same reason. It will now be noted from Figure 1 that as the bales are discharged from the rear end of the baler 10, they will drop into the carrier and onto the lengthened skids 22. During this action of course the carrier is traveling forwardly, and as soon as the bales fall onto the members 22, they will be frictionally and otherwise engaged and retained by means of the upstanding stubble, so that as a result, the bales will remain stationary, and with the rear gate or door 28 ultimately contacting the bale and holding it in fixed position. Meanwhile, this action will occur to all of the bales as they drop onto the members 22 until the entire carrier is filled with hay bales. At this point, the cable 40 is pulled by the operator, which releases the shoulders 37 of the latches 33 from engagement with the portions 31, and due to the fact that the bales are still in engagement with the stubble, the stationary bales will then cause the door 28 to open upwardly and pivot due to the journalling of the pipe 26 within the bearings 25, whereby as the carrier travels forwardly, all of the bales will be deposited in a complete group at one location. As soon as the carrier travels forward a further distance, the door 28 will pivot back to its original position shown in Figure 4, due to the fact that the upper edge of the portions 31 will slide under the sloping surfaces 38 of the latches, the arrangement then being ready for the next action in gathering and depositing the accumulated bales.

It will be noted that since the ends at 23 are unsupported, that the members 22 will have a tendency to allow the carrier to turn in the field due to the pivoting of these members on the angle member 13, the bolting at 21 being fairly loose, the member 14 merely frictionally engaging the straps 22 at 21a, so that the unit will follow the baler in a uniform manner.

It will now be seen that I have provided the various advantages set forth in the objects of my invention with various other advantages being readily apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A skid carrier for hay bales comprising a carrier unit for attachment to a hay baler, said carrier unit including a framework, a plurality of laterally spaced longitudinally extending skid members attached to said framework at their forward ends only upon which hay bales can be deposited from said hay baler, and whereby the retaining effect of field stubble against said bales will tend to keep them stationary during forward movement of the framework, so that said hay bales will be gradually positioned toward the rear of said unit, means for causing said bales to be gathered during forward travel of said unit including a vertically positioned pivoted door mounted at the rear of said unit, said vertically positioned door being pivoted at its upper end thereof, means for releasing said door so that said bales can be deposited on a field at desired intervals, including a latch member attached to the sides of said unit, members attached at the lower end of said door for engaging said latch members, means attached to said latch members for releasing the same to thereby allow said door to open to discharge said bales.

2. A skid carrier for hay bales comprising a carrier unit for attachment to a hay baler, said carrier unit including a framework, a plurality of laterally spaced longitudinally extending skid members attached pivotally to said framework for lateral movement, and at their forward ends only, upon which hay bales can be deposited from said hay baler, and the retaining effect of field stubble against said bales will tend to keep them stationary during forward movement of the framework, so that said hay bales will be gradually positioned toward the rear of said unit, means for causing said bales to be gathered during forward travel of said unit including a vertically positioned pivoted door mounted at the rear of said unit, said vertically positioned door being pivoted at its upper end thereof, means for releasing said door so that said bales can be deposited on a field at desired intervals, including a latch member attached to the sides of said unit, members attached at the lower end of said door for engaging said latch members, means attached to said latch members for releasing the same to thereby allow said door to open to discharge said bales.

References Cited in the file of this patent

UNITED STATES PATENTS

| Number | Name | Date |
|---|---|---|
| 435,417 | Gregg | Sept. 2, 1890 |
| 2,221,719 | Peterson | Nov. 12, 1940 |
| 2,304,086 | Hagan | Dec. 8, 1942 |
| 2,431,877 | Mays | Dec. 2, 1947 |
| 2,453,384 | Renken | Nov. 9, 1948 |
| 2,531,560 | De Wall | Nov. 28, 1950 |